United States Patent [19]

Matsumoto

[11] 4,445,473
[45] May 1, 1984

[54] CONTROL OF CARBURETOR-SUPPLIED INDUCTION SYSTEM

[75] Inventor: Hiromitsu Matsumoto, Hamamatsu, Japan

[73] Assignee: Yamaha Hatsudoki Kabushiki Kaisha, Iwata, Japan

[21] Appl. No.: 93,915

[22] Filed: Nov. 13, 1979

Related U.S. Application Data

[63] Continuation of Ser. No. 896,082, Apr. 13, 1978, abandoned, which is a continuation of Ser. No. 838,353, Sep. 30, 1977, abandoned.

[51] Int. Cl.³ .................................... F02M 25/06
[52] U.S. Cl. .................................. 123/308; 123/432
[58] Field of Search ............... 123/52 M, 59 PC, 308, 123/432, 442, 583, 584

[56] References Cited

U.S. PATENT DOCUMENTS

| | | | |
|---|---|---|---|
| 1,856,736 | 5/1932 | Teeter | 123/52 M |
| 2,028,585 | 1/1936 | Blake | 123/119 R |
| 2,511,213 | 6/1950 | Leslie | 123/119 R |
| 3,282,261 | 11/1966 | Barthalenew | 123/119 R |
| 3,398,938 | 8/1968 | Bascle | 123/52 M |
| 3,543,736 | 12/1970 | Suzuki | 123/119 R |

FOREIGN PATENT DOCUMENTS

| | | | |
|---|---|---|---|
| 1120063 | 6/1956 | France | 123/52 M |
| 52-105619 | 3/1977 | Japan | 123/432 |
| 1153559 | 5/1969 | United Kingdom | 123/52 M |

*Primary Examiner*—Ronald H. Lazarus
*Attorney, Agent, or Firm*—Ernest A. Beutler

[57] ABSTRACT

A control for carburetor-supplied induction systems for internal combustion engines. The engine includes a carburetor and a principal induction passage leading to an intake valve and thence to a combustion chamber. A principal throttle in the carburetor controls the supply of air/fuel mixture to the principal induction passage as a function of throttle setting and engine demand. This invention includes an auxiliary throttle valve in the principal induction passage between the principal throttle and the intake valve, and an auxiliary induction passage extending from a point in the principal induction passage between the two throttles to a point adjacent to the intake valve where its discharge will, when the intake valve is open, enter the combustion chamber in such a way as to cause swirl and/or turbulence. The auxiliary throttle is closed at light loads so that the bulk of the intake charge is delivered to the combustion chamber through the auxiliary induction passage. The invention contemplates the use of one carburetor for more than one cylinder, and also a number of carburetors equal in number to the number of the cylinders.

68 Claims, 16 Drawing Figures

CONTROL OF CARBURETOR-SUPPLIED INDUCTION SYSTEM

CROSS REFERENCE TO RELATED APPLICATIONS

This application is a continuation of my application of the same title, Ser. No. 896,082, filed Apr. 13, 1978, which application is a continuation of my application of the same title, Ser. No. 838,353, filed Sept. 30, 1977, both of which applications are assigned to the assignee of this application and are now abandoned.

BACKGROUND OF THE INVENTION

This invention relates to an induction system for an internal combustion engine that insures smooth running and minimizing pollutants under low load operating conditions.

Generally speaking, when an internal combustion engine is operated under low load, that is, with the throttle closed or nearly closed, for example at low speed, under low load, and during coasting, starting and idling operations, the efficiency of charging the air fuel mixture into the combustion chamber is so low that the speed of flame propagation is reduced to the point that combustion is unstable. For this reason, the thermal efficiency of an engine under these conditions is low, and smooth running is impossible due to resulting surges. Moreover, there is the defect that such incomplete combustion components as carbon monoxide, oxides of nitrogen and unburned hydrocarbons will be created in the exhaust.

Accordingly, recently methods have been used wherein a suitable turbulence is created in the combustion chamber for the purpose of increasing the propagation speed of the flame. There are two principal methods for creating this turbulence. One provides turbulence by "squish" of the piston during the latter portion of the compression stroke, and the other is a method wherein swirling flow in a tangential direction is imparted to the air/fuel mixture sucked into the combustion chamber by providing a shroud on the intake valve. However, with the squish method, unburned hydrocarbons are created in the squish region and are discharged in the exhaust. In the latter method, the shroud decreases the intake efficiency during high speed operation. Therefore, these methods are impractical.

SUMMARY OF THE INVENTION

This invention is directed toward the above problems. It utilizes an auxiliary throttle valve in the principal induction passage between the principal throttle valve and the intake valve which closes under low load conditions. An auxiliary induction passage connects to the principal induction passage at a point between the two throttle valves and discharges near the intake port in such a way as to create a swirling motion in the combustion chamber. This turbulence increases the efficiency of flame propagation and improves the operation of the engine.

According to an optional feature of the invention, the auxiliary induction passage departs from the principal induction passage at a point other than on its bottom surface.

According to another optional feature of the invention, an individual carburetor may be provided for each cylinder, only one of them being provided with the auxiliary induction passage and this one supplying mixture to all of the cylinders.

According to still another optional feature of the invention, the operation of the auxiliary throttle valve may be a function both of pressure in the principal induction passage and of principal throttle valve position.

DETAILED DESCRIPTION OF THE PREFERRED EMBODIMENTS

Figure 1:
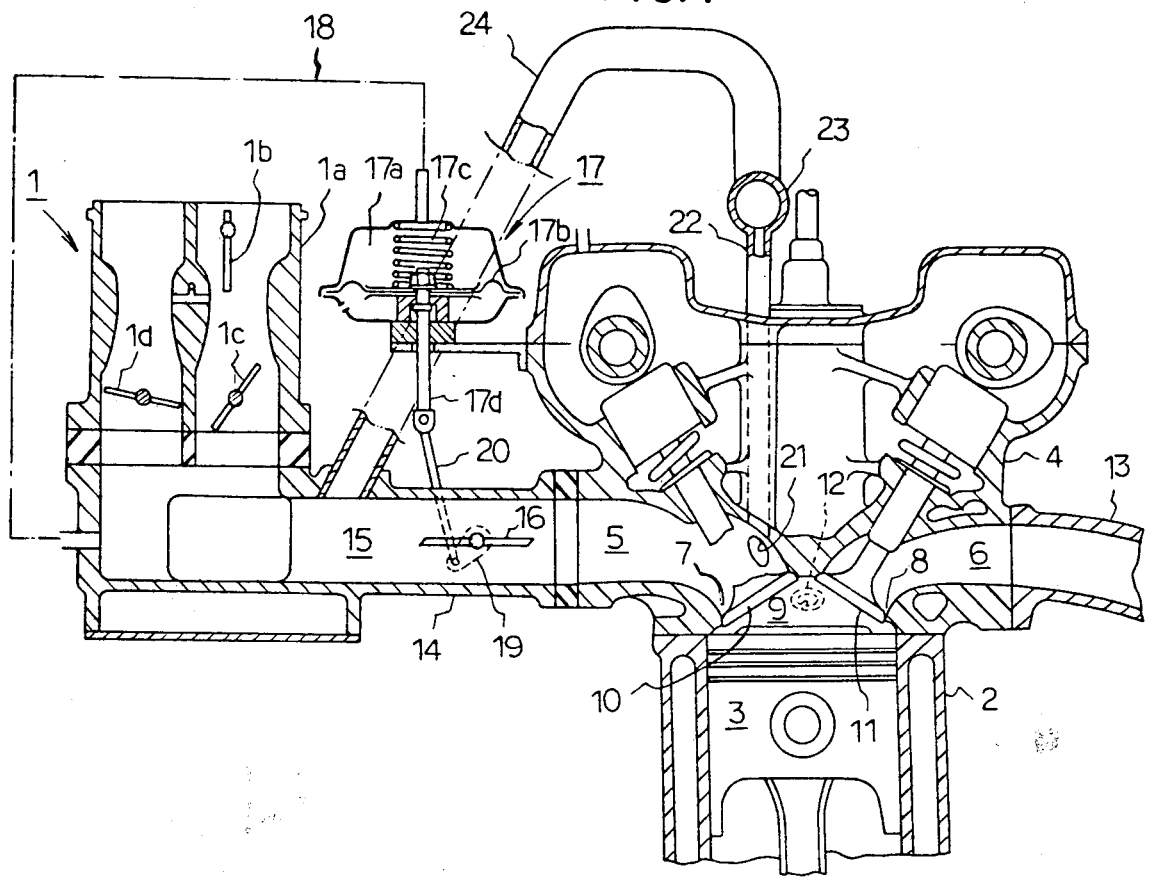
FIG. 1 is a side elevation, principally in cutaway cross-section, showing the pertinent parts of an internal combustion engine incorporating this invention.

In FIG. 1 a compound type carburetor 1 is shown which comprises a main body 1a, a choke valve 1b, a primary throttle valve 1c, and a secondary throttle valve 1d (throttle valve 1c is sometimes referred to as the "principal" throttle valve). The carburetor 1 serves a multiple cylinder engine comprising a cylinder block 2 defining a number of cylinder bores each of which encloses a respective piston 3, and having a cylinder head 4 fitted atop the cylinder block 2.

The cylinder head 4 is formed with a plurality of intake passages 5, there being one intake passage 5 for each cylinder bore and a plurality of exhaust passages 6 there also being one such exhaust passage 6 for each cylinder bore. An intake port 7 and an exhaust port 8 are formed in the cylinder head 4 at the end of each main or principal induction passage 5 and each exhaust passage 6 respectively. The cylinder bores, pistons, and cylinder head form a plurality of combustion chambers 9 with which ports 7 and 8 communicate.

An intake valve 10 and an exhaust valve 11 cooperate with each of the respective intake and exhaust ports 7 and 8. An ignition plug 12 for each combustion chamber 9 is fitted in the cylinder head. An exhaust manifold 13 connects to the exhaust passages 6. An intake manifold 14 forms with the cylinder head intake passages 5 a principal induction passage 15 with branches for each of the combustion chambers 9. The foregoing elements are conventional parts of known internal combustion engines.

Respective auxiliary throttle valves 16 are disposed in each branch of the induction passage 15. In this embodiment, the auxiliary throttle valves 16 are simultaneously controlled in response to engine load as sensed by variations in the pressure in the portion of the principal induction passage 15 between the throttle valves 1c and 1d and the auxiliary throttle valves 16.

An auxiliary throttle valve actuator indicated generally by the reference numeral 17, controls the operation of auxiliary throttle valves 16. The actuator 17 comprises a pressure chamber 17a communicating with one of the principal induction passages 15 through a conduit indicated schematically at 18. The actuator 17 further includes a diaphragm 17b, a compression bias spring 17c and an operating rod 17d. A lever 19 is secured to a common throttle shaft of the auxiliary throttle valves 16, and a link 20 interconnects lever 19 and operating rod 17d. The actuator 17 is vented to atmosphere below diaphragm 17b.

As will become apparent, the actuator 17 controls flow through discharge ports 21 each of which opens into the cylinder head main intake passages 5 upstream of intake port 7 and intake valve 10. The auxiliary ports 21 discharge in the direction of the combustion chamber 9 or more specifically toward the intake port. As will be apparent from FIGS. 1 and 2, the auxiliary ports 21 discharge into the chamber 9 at a substantially different angle than the discharge from the cylinder head passages 5.

The auxiliary ports 21 are served by an auxiliary induction passage, to be described, that receives a charge from the principal induction passage at a point upstream from the auxiliary throttle valves 16 and downstream from the principal throttle valve 1c i.e., it is connected to the intake manifold between the two throttles. The auxiliary induction passage comprises a plurality of pipes 22, one leading from each individual cylinder, a header or manifold 23 connected to all of pipes 22, and a pipe 24 connected to the header 23 and to the principal induction passage at a point between the principal throttle valve 1c and the auxiliary throttle valves 16. The pipes 22 and 24 and the header 23 constitute the "auxiliary induction or sub-intake passage". It will be observed that pipe 24 serves for all of the cylinders, header 23 serving to distribute air/fuel mixture received from the carburetor 1 among the various cylinders through pipe 22.

The effective cross-section of the auxiliary induction passage is smaller than the cross-section of the principal induction passage. Usually pipe 24 will have a cross-section only one-tenth as great as that of passages 5 and 14 for reasons which will be evident.

At high speed and high load conditions, wherein the primary throttle valve 1c is open as shown in FIG. 1, the intake vacuum in the principal induction passage 15 is low and therefore the operating rod 17d is not raised by the diaphragm against the bias force of compression spring 17c. Under this circumstance, the auxiliary throttle valve will be in the open condition as shown in FIG. 1.

On the other hand, when the engine is starting with the principal throttle valve closed, idling or operating under low load conditions, the vacuum in passage 15 is high due to the small opening of the principal throttle valve 1c. Under these circumstances, a greater negative pressure is experienced in chamber 17a so that atmospheric pressure below the diaphragm 17b causes it to raise the operating rod 17d and the auxiliary throttle valves 16 will rotate in a clockwise direction as seen in FIG. 1 to close or leave only partially open the principal induction passage 15. When the auxiliary throttles 16 are closed or nearly closed, the air/fuel mixture supplied from the carburetor will be drawn into the combustion chambers 9 through the pipe 22, header 23 and pipe 24 i.e., through the auxiliary induction or sub-intake passages rather than through the principal induction passages. Since the cross-sections of these auxiliary passages are comparatively small relative to the principal induction passage, the velocity of the fluid flowing therethrough will be comparatively increased. Moreover, since the discharge port 21 opens towards the combustion chamber at a different angle than the port 7, the air fuel mixture supplied at this faster velocity through the discharge port 21 takes the form of a jet stream and creates a swirling flow in the combustion chamber 9.

Figure 4:
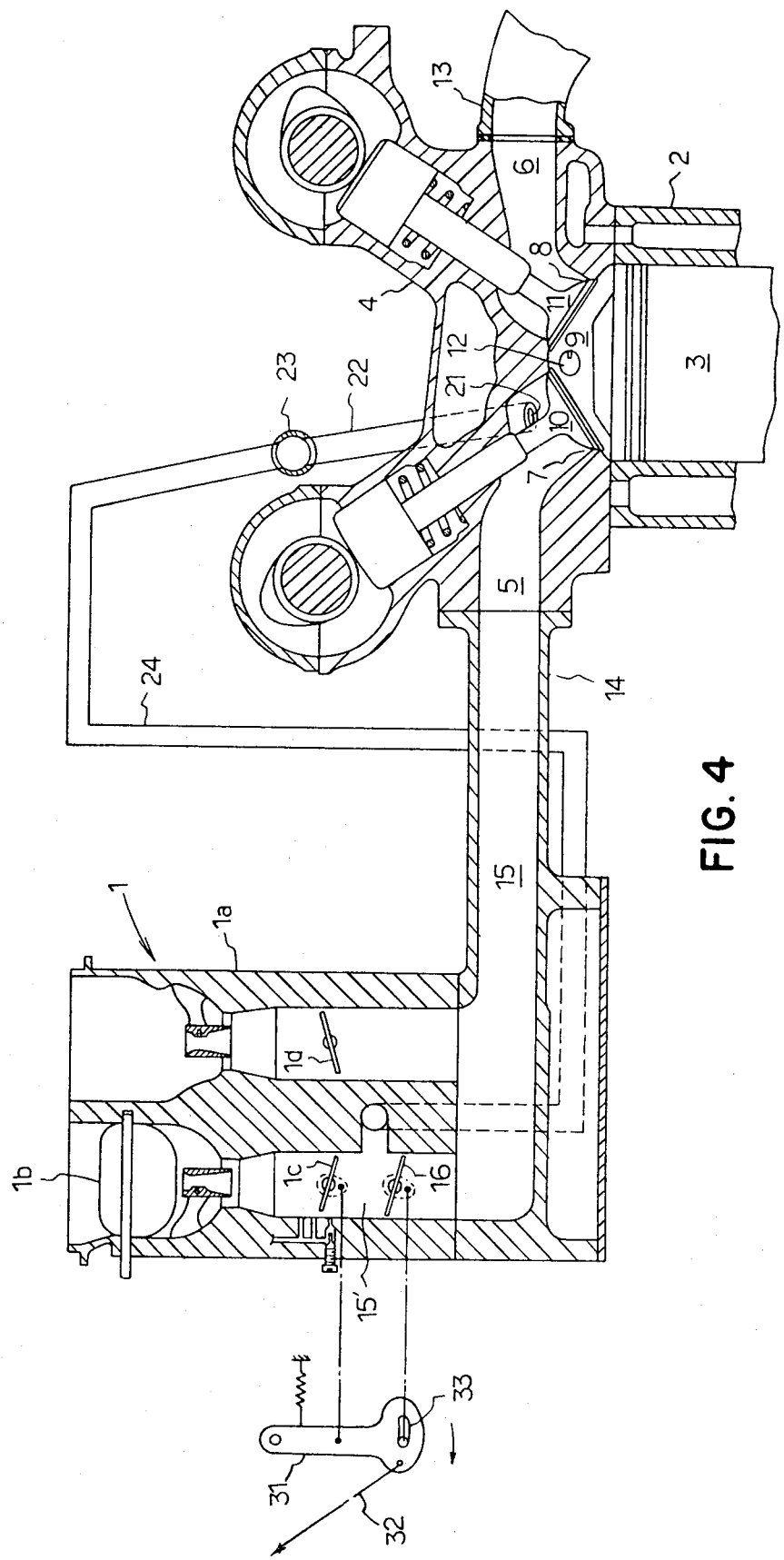
FIG. 4 is a view similar to FIG. 1, showing another embodiment of the invention.

FIG. 4 shows another embodiment of the invention. Identical reference numbers are used for identical parts and where these parts function in the same manner as the previously described embodiment they will not be described again in detail. In the embodiment of FIG. 1, the position of the auxiliary throttle valves 16 was controlled by pressure in the principal induction passage upstream from the auxiliary throttle valve and downstream from the principal throttle valve. In the FIG. 4 embodiment, control is effected mechanically by a lever or bellcrank 31 which is rotated by actuation of a conventional acceleration pedal (not shown) via a cable or link schematically indicated at 32.

Also, it is the purpose of this embodiment to show that the carburetor may be either a single or double barrel, and that if used with a double barrel staged carburetor the sub-intake or auxiliary induction passage may be served by only the primary stage of the carburetor while still being operated in response to actuation of the principal throttle valve.

In FIG. 4, a single auxiliary throttle valve 16' is mounted in the primary induction passage 15' of the main body 1a of carburetor 1. The primary throttle valve 1c is connected directly to lever 31 which in turn is connected to an accelerator pedal by means of the wire 32 for direct operation of the primary throttle valve 1c. The operation of the secondary throttle 1d is pressure-responsive as well-known in conventional carburetor operations. The secondary throttle valve 1a is closed during low load operation, so only the primary throttle valve is pertinent to low load operation.

The auxiliary throttle valve 16' is connected to the bellcrank 31 by means of a lost motion connection consisting of a cross-pin 34 in a slot 33 formed in bellcrank or lever 31. As a consequence, when the accelerator pedal is first actuated to rotate lever 31 in the direction of the arrow (clockwise), the primary throttle valve 1c will immediately rotate in its opening direction. However, the auxiliary throttle valve 16c will not rotate until the cross-pin comes to the end of the slot 33. This is a "lost motion" device. The auxiliary throttle valve 16c will therefore not move to its open condition when the primary throttle valve 1c is open only a little, but only opens after a given amount opening movement of the primary throttle valve. Thus the auxiliary throttle valve 16c remains in its closed position during closed and nearly-closed positions of the principal throttle valve 1c, but opens when the principal throttle 1c is opened by an increasing amount.

Figure 3:
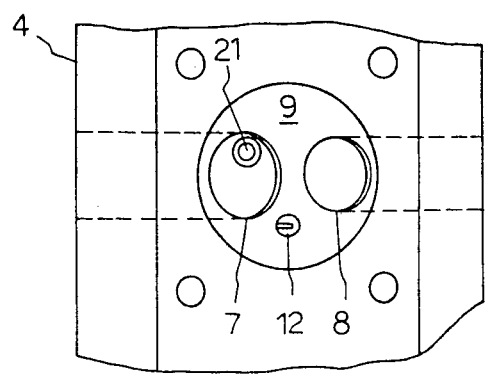
FIG. 3 is a partial view taken along the line 3—3 in FIG. 1.
Figure 2:
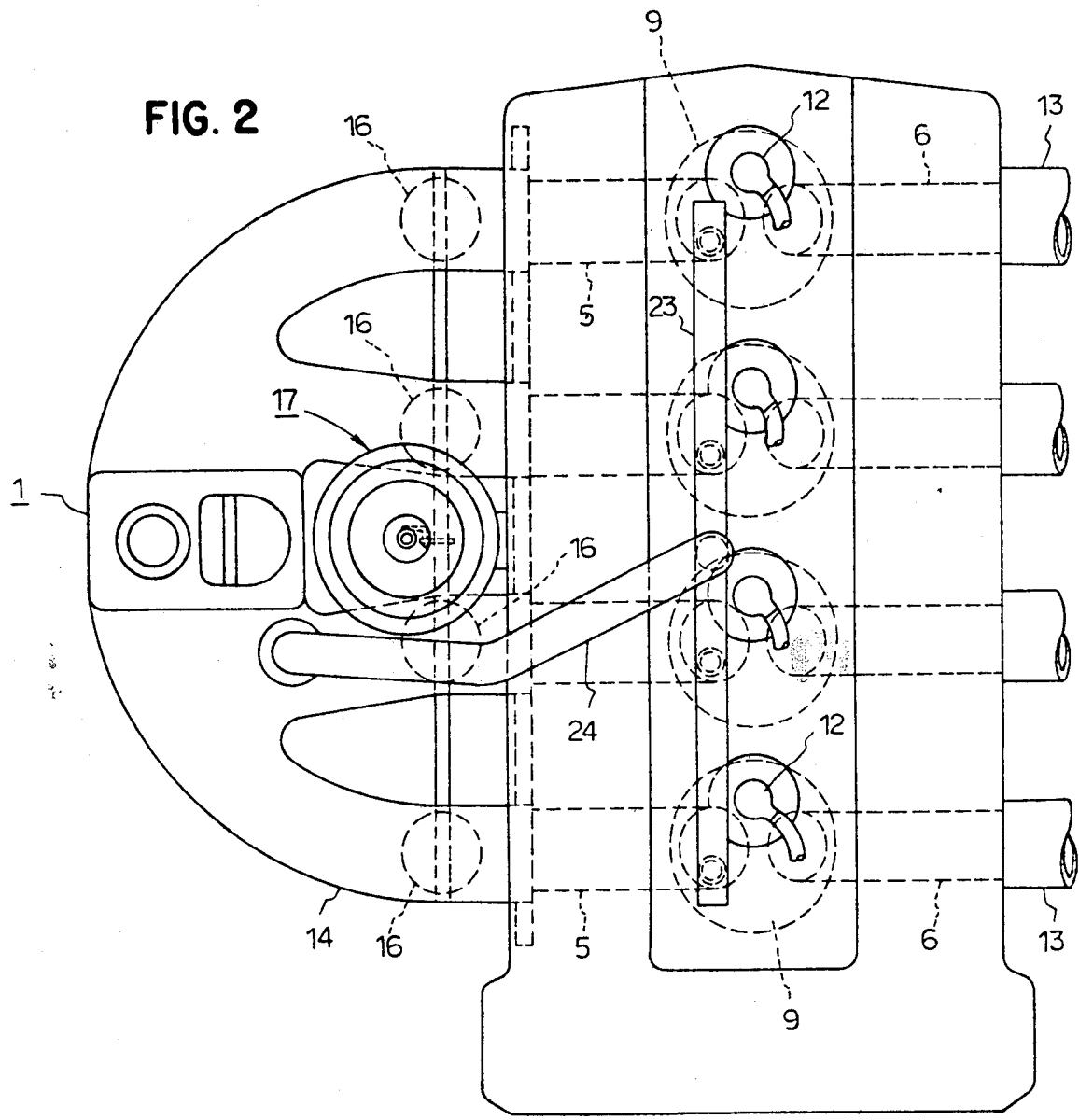
FIG. 2 is a top plan view of the embodiment shown in FIG. 1.

The embodiment of FIG. 4 operates in a manner similar to the embodiments of FIGS. 1-3, however, in this embodiment the positioning of the auxiliary throttle valve 16' is controlled mechanically in response to the position of the primary throttle valve 1c. Also, in this embodiment the auxiliary induction system comprising the conduit 24, manifold 23, and pipes 22 receive their fuel/air mixture only from the primary side of the carburetor 1. This is sufficient in this embodiment since the fuel/air requirements of the engine, which are supplied by the auxiliary induction system, are similar to those supplied by the primary side of the carburetor 1. Said another way, the auxiliary induction system is primarily operative at idle and low speed operation and the fuel/air mixture during the phase of operation is supplied solely by the primary side of the carburetor 1.

In both of the foregoing embodiments, the principal induction passages upstream from the auxiliary throttle valve (FIG. 4) or valves (FIGS. 1-3) are interconnected with the auxiliary induction passages which are primarily exposed on the outside of the engine and formed primarily by external pipes. It is of course possible to form this conduitry inside the engine construction itself or even to cast the passage therein. It is also possible to install the auxiliary induction passage tubing inside the principal induction passage in which event a channel would be provided for receiving the conduitry.

It is evident that this invention is applicable to a single barrel carburetor as well as multiple barrel carburetors and also single barrel type carburetors with piston or air valve type throttle valves.

The essence of the invention should be understood from the foregoing. If the auxiliary throttle valve and sub-intake passages were not provided, then at idle and low load operation the comparatively small amount of fuel/air mixture which flows with the principal throttle valve nearly closed would flow only sluggishly through the primary principal induction passage and unstably into the combustion chamber. This problem is particularly prevalent at low temperatures when condensation is more likely to occur in the various induction passages. It has been the practice to compensate for such conditions by providing overly rich mixtures, which has the effect of seriously reducing fuel economy under such conditions. However, with the auxiliary throttle valve closed and the auxiliary induction passage provided, the mixture is caused to flow through the smaller cross-section auxiliary induction passage which because of its smaller area causes the mixture to flow at a considerably higher rate of speed, and exit from the discharge ports 21 as a jet entering the combustion chambers 9 to create turbulence therein and improve the flame propagation. This improvement in turbulence is made without requiring the use of a shroud or of a squish action, thereby enabling the engine to operate at good efficiency at high load conditions and not generating noxious pollutants as the consequence of squish action.

As has been noted, it is known that a part of the fuel of an air/fuel mixture attaches to the wall of the induction passage and flows along it particularly at low temperatures. The rate of air flow through the auxiliary induction passage varies greatly. It is large during light load operation when substantially all of the fuel air mixture flows therethrough and smaller during heavy load operation when very little flows therethrough. As a consequence, the rate of supply of liquid fuel on the wall of the auxiliary induction passage can abruptly change whereby to cause a deviation of the air fuel ratio from the predetermined one and cause irregular operation of the engine. It is possible to reduce this effect by minimizing the supply of liquidus fuel to the auxiliary induction passage. This is accomplished in the embodiment of FIGS. 1-3 by providing the upstream entrance port 70 to pipe 22 at a location other than on the bottom surface 71 of the principal induction passage. In FIG. 1 entrance port 70 is in the top surface 72. In FIG. 4 a similar result is obtained by positioning the entrance port in a side surface 73.

Figure 5:
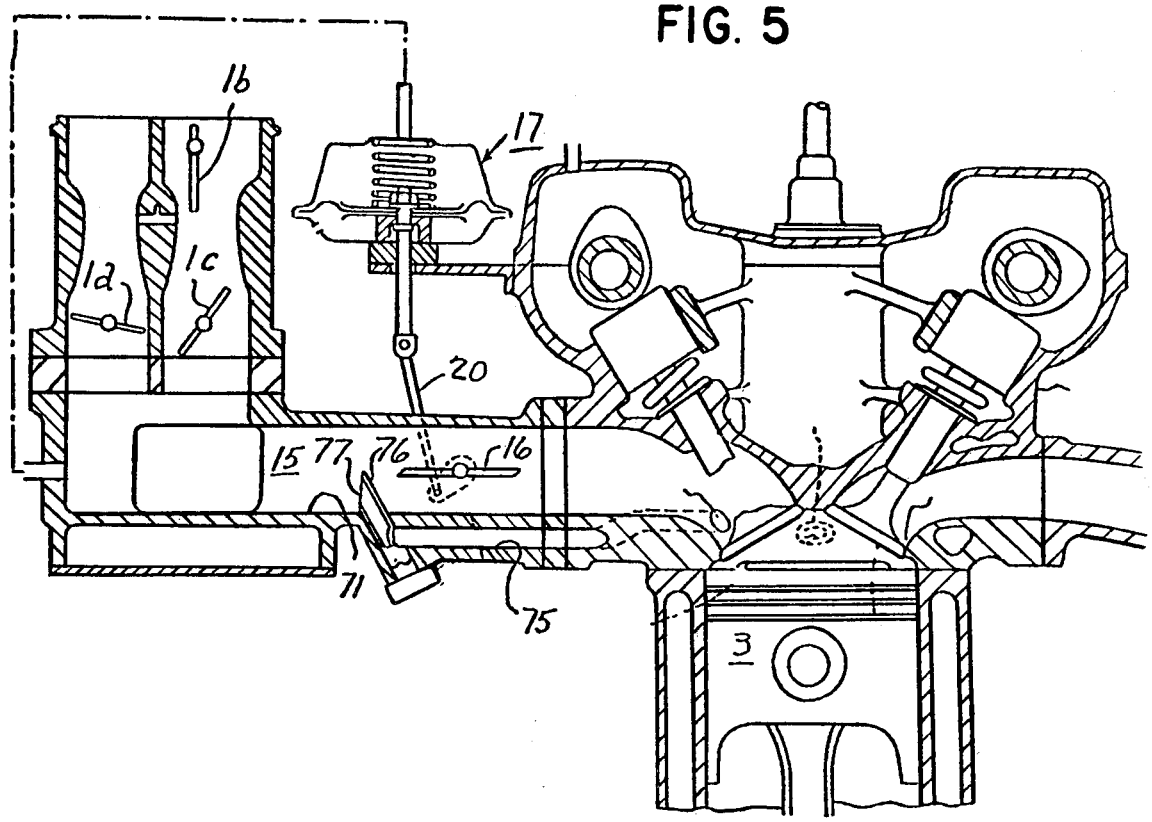
FIG. 5 is a view similar to FIG. 1 showing still another embodiment of the invention.

The embodiment of FIG. 5 shows another way of achieving this result and further increasing the velocity of the charge flowing through the auxiliary or sub-intake passage. In the embodiment of FIG. 5 an auxiliary induction passage 75 is formed in the body of the intake manifold and cylinder head and is fed from a ram pipe 76 having an upstream entrance port 77 which is spaced from bottom surface 71 of the main induction passage and which faces in the direction of the oncoming mixture. This provides a dual advantage. First it receives its air fuel mixture at a point spaced above the bottom surface so as to receive only a minimum of liquid fuel, and second it receives a ram boost effect which accelerates the flow through the auxiliary induction passage.

In this embodiment the construction of only a single cylinder of the engine has been illustrated. It is to be understood, however, that the illustrated invention may be employed with multi-cylinder engines as in the preceding embodiments.

In FIGS. 1, 4 and 5, the auxiliary induction passage has its upstream entrance port (point of entry) elsewhere than on the bottom surface i.e., spaced therefrom so that liquid fuel does not enter directly from the bottom wall of the induction passage. Only air fuel mixture therefore enters the auxiliary induction passage.

A conventional arrangement for sports car engines is to provide one carburetor barrel or venturi for each cylinder while conventional passenger cars utilize a single carburetor (with one or more than one barrels) to supply all of the cylinders. This invention is adaptable to use with sports car engines wherein there is one carburetor barrel or venturi for each cylinder. Such an arrangement is shown in FIGS. 6-10 inclusive.

Figure 6:
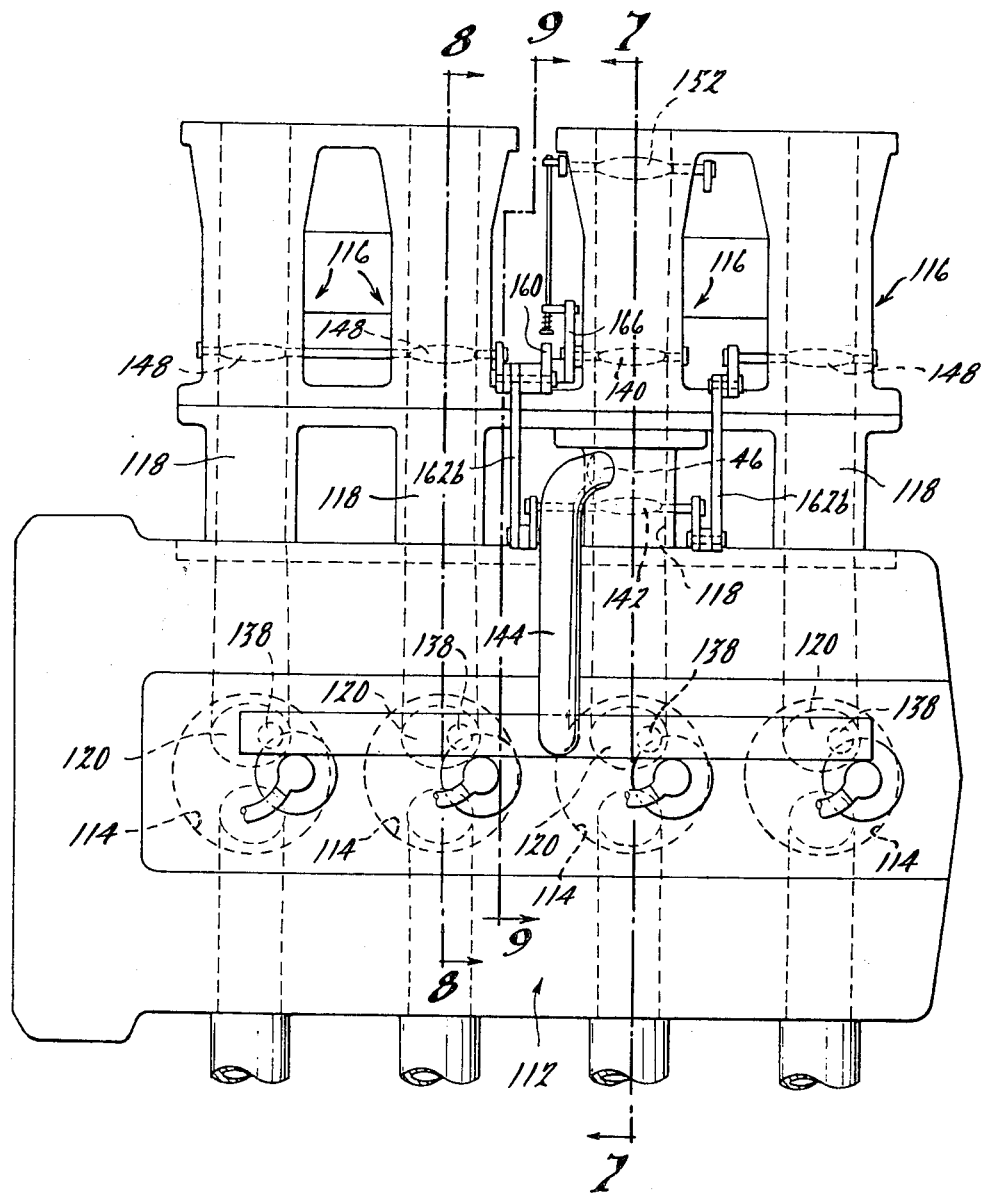
FIG. 6 is a plan view showing another embodiment of the invention.
Figure 7:
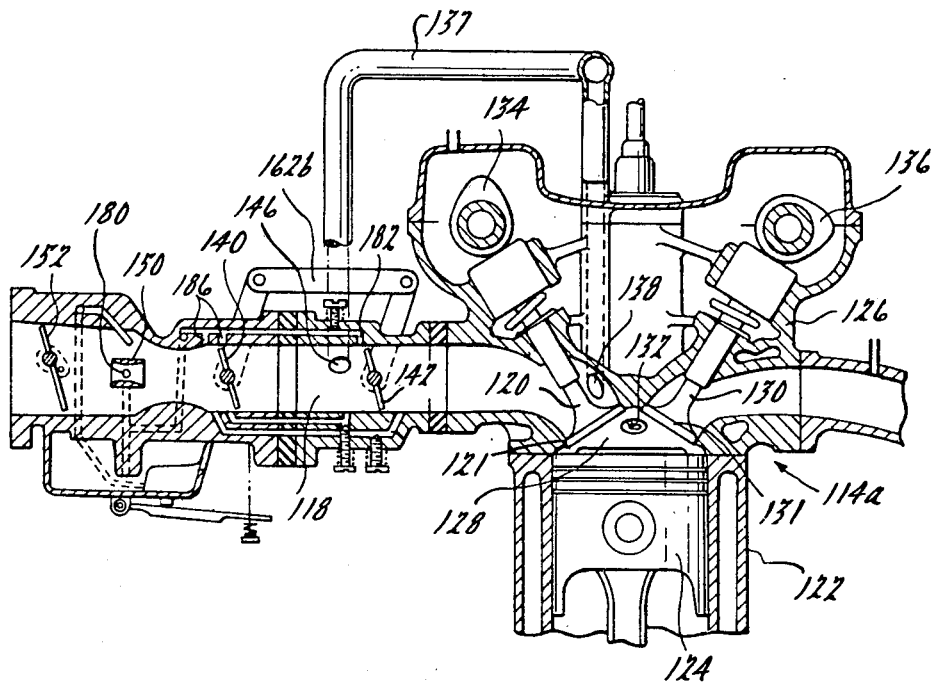
FIG. 7 is a cross-section taken at line 7—7 in FIG. 6.

In FIGS. 6-10, a multi-cylinder internal combustion engine 112 includes a plurality of cylinders (4 cylinders 114 in the illustrated engine) each of which is served by a respective carburetor venturi 116 connected through a respective manifold induction passage 118. Each cylinder 114 has an intake valve 120 which cooperates with an intake port 121 formed at the intersection of the combustion chamber and of a cylinder head main intake passage. As best shown in FIG. 7 which shows the cylinder more particularly marked 114a and its respective system, a piston 124 reciprocates in cylinder 122. A combustion chamber 128 is defined inside the cylinder 122 between the upper face of the piston and cylinder head 126. The cylinder head includes the intake valve 120 and an exhaust valve 130 in an exhaust port 131, and an ignition plug 132. Cams 134 and 136 control the opening and closing of the intake valve 120 and exhaust valve 130 respectively. The engine strokes of the respective cylinders are 90 degrees out of phase.

An auxiliary induction manifold 144 has a plurality of branches each of which discharges through a respective discharge port 138 for discharging therefrom a fast-moving stream of fuel air mixture into combustion chamber 128 during the intake stroke of the respective cylinder to cause turbulence in the gases in the combustion chamber, thereby improving the combustion speed when the engine is operating under low load conditions as previously described. As in the preceding embodiments, the direction of charge delivered to the combustion chamber 128 from the auxiliary induction passage discharge ports 138 is substantially different from the direction of discharge from the main intake port 121. The foresaid arrangement is common to all of the cylinders.

Figure 8:
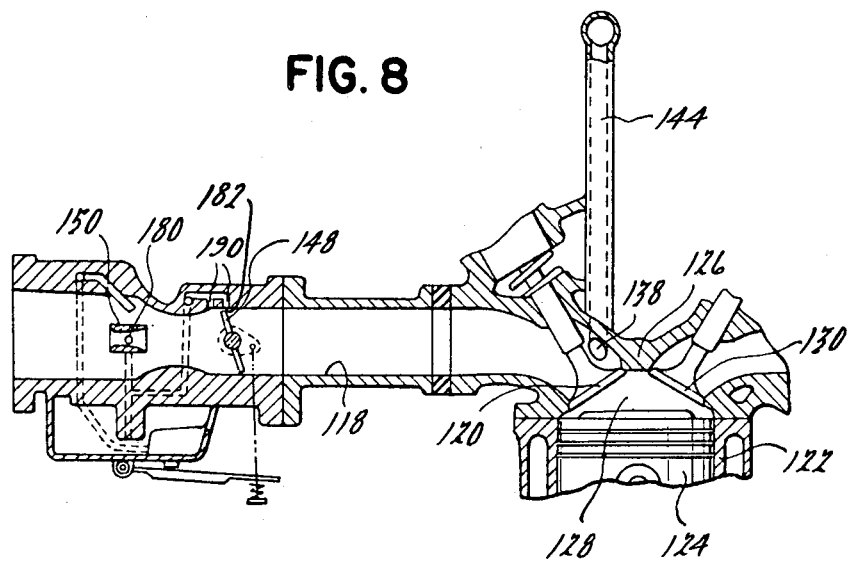
FIG. 8 is a cross-section taken along the line 8—8 in FIG. 7.

In this embodiment, one of the four cylinders, in this case cylinder 114a, has additional structure not found in the other three cylinders. In connection with this cylinder, its manifold induction passage 118 includes an auxiliary throttle valve 142 downstream from the principal throttle valve 140 of the carburetor venturi 116. An auxiliary induction pipe 137 is fed from the principal induction passage of cylinder 114a between the two throttles 140 and 142 from a port 146 as best shown in FIG. 7. The cylinders 114 other than 114a, however, each include a respective throttle 48 in the induction passage of their respective carburetor venturi, but there is no inlet to the auxiliary passage and no auxiliary throttle valve. An example of the other cylinders i.e., cylinder 114b is shown in FIG. 8.

Figure 9:
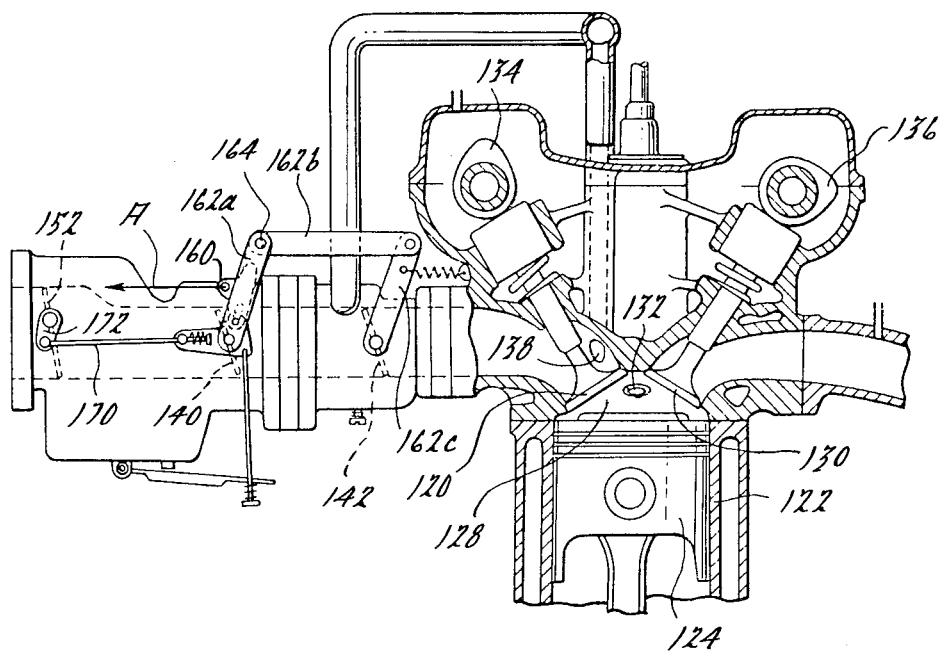
FIG. 9 is a side view of the embodiment of FIG. 6 with portions broken away.

As best shown in FIGS. 6, 7 and 9, the auxiliary induction pipe 137 runs from its inlet 146 to the auxiliary induction manifold 144 that has four branches 145, one for each of the cylinders discharging through the respective discharge port 138. Therefore, the auxiliary induction passage derives its fuel air mixture from only one of the carburetor venturis but distributes it to all of the cylinders 114.

In operating this engine, throttle valve 140 which is the principal throttle, first opens. Then in sequence, the auxiliary throttle valve 142 will open. The principal throttle valves 148 in the other three cylinders are drivingly connected to the auxiliary throttle valve 142 to move simultaneously, with it. Therefore, the three throttle valves 148 in the carburetors for the cylinders other than cylinder 114a are in their fully opened positions when the auxiliary throttle valve 142 is in its fully opened position.

A choke valve 152 provides engine starting fuel supply means in the upstream side of venturi 150 in the carburetor 116 for cylinder 114a. No similar engine starting fuel supply means is provided in the carburetors for the other cylinders. Choke valve 152 is controlled in any known manner but is operated to open before the auxiliary valve 142 opens, and also opens before throttle valves 148 in the other carburetors start to open.

A desirable mechanism for controlling throttle valves 140, 142 and 148 and the choke valve 152 is illustrated in FIGS. 6, 7, 9 and 10. In this embodiment, the valves are controlled by the operator's exerting a pull on a control cable in the direction indicated by arrow A (FIG. 9) to pull a first lever 160. When the first lever 160 is not pulled the system is biased in any known manner in the direction such that all of the throttle valves 140, 142 and 148 and the choke valve 152 remain closed.

Figure 10:
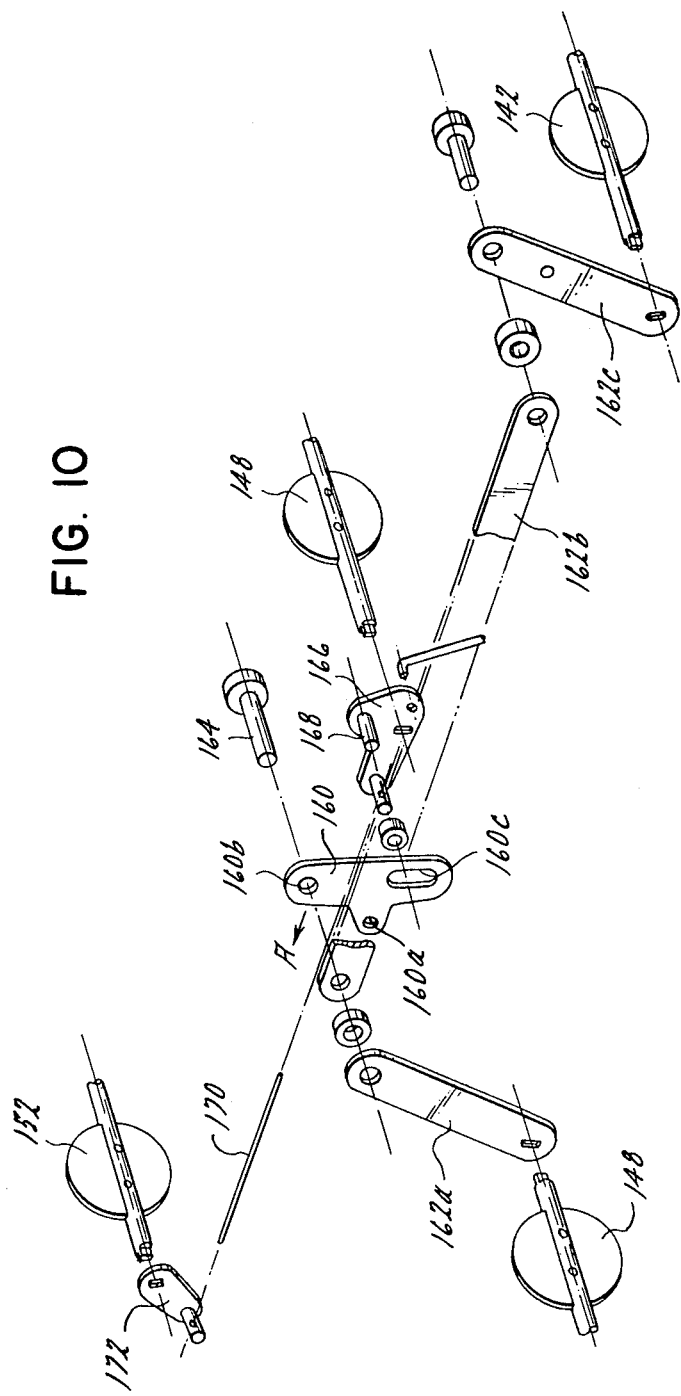
FIG. 10 is an exploded view of the throttle linkage of the embodiment of FIG. 6.

First lever 160 is shaped as shown in FIG. 10 and is rotated upon initial movement in a clockwise direction about a pin 164 inserted in hole 160b when pulled through its hole 160a in the direction of the arrow A. The first lever 160 is connected at 160b through the pin 164 to a parallelogram linkage mechanism comprising parallelogram links 162a, 162b and 162c. This mechanism is drivingly connected to throttle valves 148 in the carburetors for the other three cylinders and to auxiliary throttle valve 142. First lever 160 is formed with an elongated hole 160c in which a pin 168 is slidably engaged to provide a lost-motion device for a reason which will become apparent. Pin 168 is fixed to a second lever 166 that in turn is fixed to the shaft of throttle valve 140 for cylinder 114a.

Thus, in the initial stage of valve opening operation, rotation of first lever 160 in its clockwise direction, initially about the pin 164, causes the second lever 166 to rotate in the counter-clockwise direction to slightly open the throttle valve 140 for cylinder 116a. In the initial stage of this movement, the link mechanism including links 162a, 162b, and 162c does not rotate. Thus the auxiliary throttle valve 142 and throttle valves 148 in the carburetors for the other cylinders remain closed. This attends to starting and idling operation and for much of the low load operation. However, since an operation lever 172 fixed to the choke valve 152 is connected through a rod 170 and spring to the second lever 166, they are closed in the initial stage when the second lever 166 is rotated to a predetermined position slightly to open the throttle valve 140. In other words, choke valve 152 may be in the closed position when the engine is operating under low load conditions where the auxiliary throttle valve 142 and the throttle valves 148 for the other cylinders still remain closed.

When the first lever 160 is further rotated and the throttle valve 140 is opened to a sequential intermediate open position, pin 168 of second lever 166 in engagement with the elongated hole 160c of the first lever stops at one end of the elongated hole 160c. Thus upon continued pivotal movement of the lever 160, second lever 166 is next rotated in the counter-clockwise direction to continue to open throttle valve 140 and simultaneously to start rotation of the link mechanism having the links 162a, 162b and 162c in the counter-clockwise direction. The rotation of the described parallel link mechanism causes opening of the auxiliary throttle valve 142 and all of the throttle valves 148 for the other cylinders simultaneously.

The simultaneous opening of the throttle valves 140, 142 and 148 will continue until the throttle valve 140 reaches its fully opened position. In a preferred embodiment, this occurs prior to full opening of the throttle valves 142 and 148. When the throttle valve 140 reaches its fully opened position, a continued pull on the lever 160 in the direction A will cause this lever to now pivot about the pivot pin 168. Thus, the throttle valve 140 will be retained in its fully opened position while the throttle valves 142 and 148 are moved to their fully opened position by the parallelogram linkage system consisting of the links 162a, 162b and 162c.

By means of the mechanism described above, the auxiliary throttle valve 142 provided downstream of principal throttle valve 140 for the one cylinder (cylinder 114a) is opened sequentially after the principal throttle valve 140 is opened, and the throttle valves 148 for the other cylinders are opened and closed at the same time as the auxiliary throttle valve 142 is opened and closed.

Where a choke valve 152 is provided in the venturi that serves the cylinder 114a as engine starting fuel supply means, choke valve 152 is caused to open before the auxiliary throttle valve 142 and the throttle valves 148 for the other cylinders start to open. It has been previously noted that the choke valve 152 may be positioned in its closed condition in any known manner. When the lever 160 moves to such a position that the throttle valve 140 reaches its fully opened position, the lever 166 will exert a force on the choke valve lever 172 through the wire 170. Thus, the choke valve 152 will be moved to at least a partially opened position. As will be noted from FIG. 6, the wire 170 is connected to the lever 166 only via a spring so that the choke valve actuating mechanism will not affect positioning of the various throttle valves 140, 142 and 148.

A fuel supply system for this embodiment will now be described. A boost venturi 150 and discharge nozzle is provided in the barrels of the carburetors for each respective cylinder at the upstream side of the respective principal throttle valve 140 or 148, and main fuel supply ports open to the boost venturis so that fuel is measured and mixed with air for every cylinder during normal engine operation precisely as is accomplished with conventional carburetor constructions. However, fuel supply to the engine is controlled principally by the carburetor barrel for the one cylinder 114a (FIG. 7) when the engine is started, idling or operating under low load conditions.

Choke valve 152 is provided as engine starting fuel supply means only in the carburetor barrel associated one cylinder 114a, and the rich mixture made by the closing of choke valve 152 is supplied not only into this one cylinder, but also into the other cylinders through the auxiliary induction passage from the pipe 137, manifold 144, and ports 138. Accordingly, the rich fuel mixture required when the engine is started is uniformly supplied to the respective cylinders still using only one choke valve in the system leading to the one cylinder 114a.

An idle port 182 is provided only in the carburetor barrel for the said one cylinder (114a), and opens near the auxiliary throttle valve 142 at the upstream side thereof, so that fuel can be supplied through the auxiliary induction passage 144 to the respective cylinders when the engine is idling. Air in the amount required for engine idling is supplemented by air leakage past the throttle valves 148 for the other cylinders even though these throttle valves 148 are in their closed position.

It has been found, however, that the amount of air leakage from the closed throttle valves 148 for the respective cylinders tends to be reduced by carbon adhering thereto due to back-flow from the combustion chambers. In order to compensate for the reduction of the leakage air, an air compensation passage 148 is provided with its inlet and outlet extending between the upstream and downstream sides of throttle valve 140 to bypass this throttle valve 140. The air compensation passage 184 is provided with a flow adjusting screw 184a. The air flow through passage 184 is supplied through auxiliary induction passage consisting of pipe 132, manifold 144, and ports 138 into the cylinders 114 so that the same amount and desired density of air fuel mixture is uniformly supplied to the respective cylinders, thereby providing for a smooth idling operation of the engine.

In the vicinity of throttle valve 140 associated with the one cylinder 114a, there is provided a fuel supply port 186 for use when the engine is operating under low load conditions in order that fuel supplied from port 186 can also be supplied through auxiliary induction passage consisting of pipe 137, manifold 144 and ports 138 to the other cylinders. It is preferable in this case to provide an air adjusting passage 188 in the carburetor associated with the said one cylinder 114a with its inlet between the throttle valve 140 and the boost venturi 150, and its outlet formed on the upstream side of the auxiliary throttle valve 142 to bypass the throttle valve 140 and the auxiliary throttle valve 142 in order to prevent the occurrence of unbalanced air supply into the cylinders 114 other than cylinder 114a. Such imbalance could be caused by flow due to the negative pressure created in other cylinders in auxiliary induction system when the engine is operating under low load conditions. The passage 188 is provided with a flow adjusting screw 188a.

In the induction arrangement according to this embodiment, the fuel supply is controlled at starting, idling and operation under low load conditions only by the induction system of the one cylinder 114a. The air/fuel mixture from its carburetor barrel is supplied to all of the cylinders through the auxiliary induction system whose inlet is open to the induction passage for the said one cylinder, but its downstream end portion is branched to connect to all of the cylinders. When the opening of principal throttle valve 140 is beyond a predetermined amount during normal engine operation, then the fuel supply into all of the cylinders will be controlled by the respective carburetor and the respective principal throttle for each carburetor.

Transition fuel supply ports 190 are formed in the vicinity of throttle valves 148 in the respective carburetors for the cylinders other than cylinder 114a in order to compensate for delayed fuel ejection from their main ports 180 of their boost venturis 150 when throttle valves 148 are opened. This provides for a smooth transition between low speed engine operation and high speed engine operation. The method of delivering fuel from the carburetor fuel bowls to the various ports which have been described in conventional and, for this reason, it has not been described in detail. In a like manner, each of the carburetor barrels 116 incorporates an accelerating pump, which also is conventional and thus has not been described.

This embodiment supplies the following advantages. First, the fuel supply means for use at starting, idling, and operation under low load conditions is provided by the fuel supply means associated with only one cylinder and the air/fuel mixture from this carburetor barrel is supplied to all of the respective cylinders through a system which is simple in structure. Second, this arrangement provides for a uniform fuel supply to all of the respective cylinders when the engine is operating under low load, starting, and idling conditions and provides a multi-cylinder internal combustion engine which is simple to adjust and easy to use.

The embodiment of FIGS. 11–16 provides for both a pressure-responsive and for a main throttle position responsive control over the position of an auxiliary throttle valve. The similarity of the engine to that shown in FIG. 1 will be evident, so that detailed description of the various parts which are the same will not be repeated. It will be noted, however, that whereas the automatic auxiliary valve actuator in the embodiments of FIGS. 1–3 and 5 sense the pressure in the induction passage closer to the plenum of the induction manifold than to the primary throttle valve it may be found in some instances preferable instead to connect a conduit 200 to an opening 202 adjacent to a principal throttle valve 204 just downstream of its closed position. Accordingly, when the principal throttle valve 204 is closed there will be a low pressure or high vacuum associated with low speed, idling, or starting operations (starting being accomplished with the principal throttle valve closed). However, when the principal throttle valve 204 is opened, opening 202 will then lie on the upstream side of the throttle valve 204 and experiences a sudden increase in pressure because it is closer to atmospheric pressure because of its nearness to the inlet end of the carburetor. However, this merely provides for an increasingly quick response but does not change the general operational scheme of the device.

As in the other embodiments, an auxiliary throttle valve 206 is provided in the principal induction passage 208. An auxiliary induction passage 210 departs from the principal induction passage 208 at a point between the two throttle valves (202 and 206) and discharges through a discharge port 212 to the intake port 214 of a combustion chamber upstream of the intake valve 216. The auxiliary port 212 is directed toward the intake port 214 but the discharge from auxiliary port 212 is at a different angle than the discharge from the main port 214. The effect in creating turbulence is the same as in the other embodiments and these details will not be described again.

The purpose of this embodiment is to illustrate another means of control for the auxiliary throttle valve 206. In this embodiment, an actuator 218 is provided which is responsive to pressure in the induction passage, low pressure (high vacuum) therein causing a diaphragm 220 in the actuator 218 to raise (its underside being vented to atmosphere) and to pull upwardly on rod 222 which rod is connected by a link 223 to a lever 224 (FIGS. 13-15) that is pinned to the shaft 228 of the auxiliary throttle valve 206. The shaft 228 is rotatably mounted in the wall of the induction passage.

Figure 11:
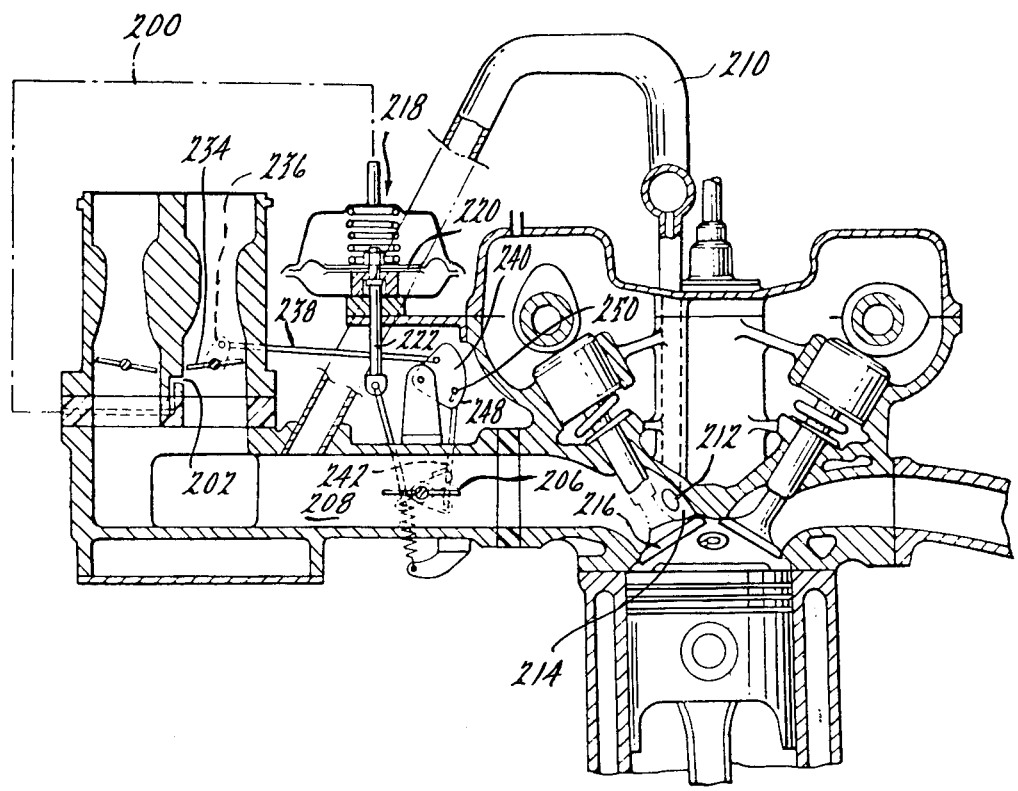
FIG. 11 is a fragmentary cross-section showing the pertinent parts of an internal combustion engine incorporating another embodiment of the invention.

A flange 230 supports one end of a coil spring 232 which also is attached to the throttle valve lever 224 which adds additional bias force to that of bias spring in the actuator. Therefore, when atmospheric pressure exists in the induction system, the effect of the actuator 218 is to cause the auxiliary throttle valve 206 to be in its open position. Principal throttle valve 202 (which is the valve in the primary barrel of a staged two barrel carburetor as illustrated or which may be the only barrel of a single barrel carburetor) is fixed to a lever 236 to which a push rod 238 is connected. This rod 238 connects to a pivoted plate 240 that connects to another push rod 242 connected to an idler lever 244 that is freely pivotally mounted on the shaft 228. Counter-clockwise movement of plate 240 as seen in FIG. 11 results from a force exerted on an accelerator to open the principal throttle valve 202. This movement of plate 240 will rotate the idler lever 224 counter-clockwise through the push rod 242. This will have no effect on the position of the auxiliary throttle valve except under a circumstance yet to be described.

On lever 224 there is an abutment flange 246 which overhangs the plane of idler lever 244. Accordingly it is possible for the idler lever 244 to abut the abutment flange 246 and overpower the effect of the actuator 218 under certain circumstances.

Figure 15:
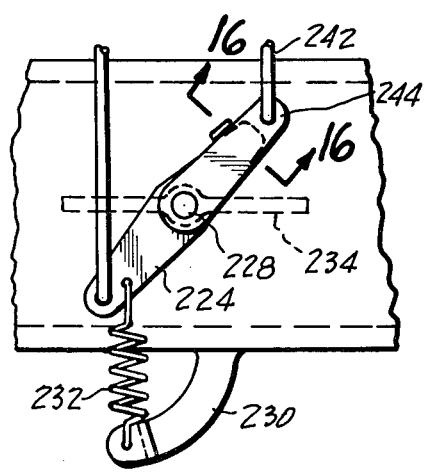
FIG. 15 is a view similar to FIGS. 13 and 14 showing the throttle linkage in another control position.
Figure 16:
FIG. 16 is a cross-section taken at line 16—16 in FIG. 15.
Figure 13:
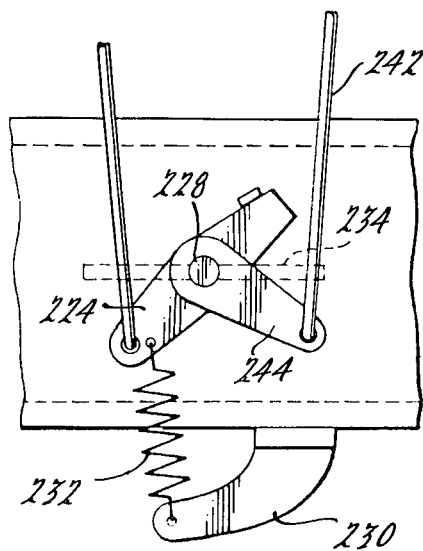
FIG. 13 is a fragmentary view showing the throttle linkage in the control condition of FIG. 11.
Figure 12:
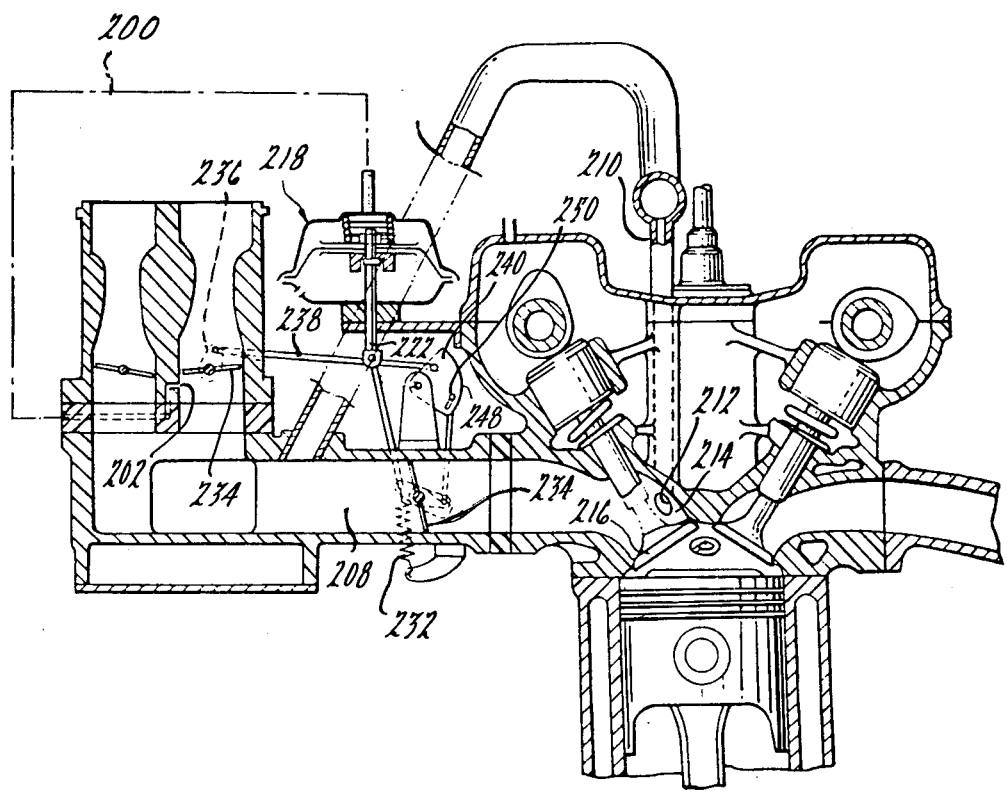
FIG. 12 is a view similar to FIG. 11 showing the device in another operating condition.
Figure 14:
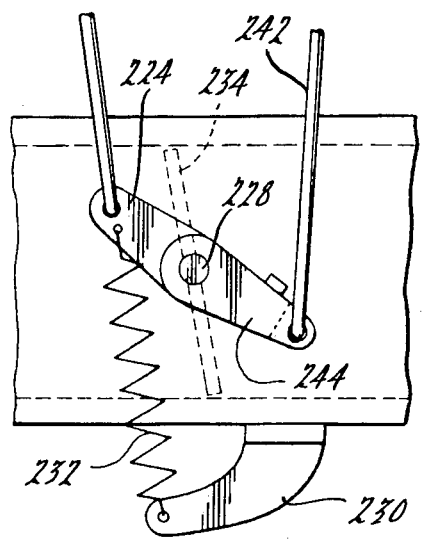
FIG. 14 is a fragmentary view showing the throttle linkage in the control condition of FIG. 12.

FIG. 11 shows the condition of the engine when it is stopped. FIG. 12 shows the condition of the engine at low speed, idling or starting operation. FIG. 13 is an enlarged view showing a portion of the linkage in the condition of FIG. 11. FIG. 14 is a similar view showing the condition of FIG. 12. FIG. 15 shows the condition of the system under heavy load operation.

In FIGS. 11 and 13, the engine is not running and atmospheric pressure acts on actuator 218 and is insufficient to cause the actuator 218 to close the auxiliary throttle valve 206. The primary throttle valve 202 is closed at this time. Therefore, the condition will be as shown. In FIGS. 12 and 14, when the engine is idling or running at slow speed the low pressure in the induction system will be transferred to the upper side of diaphram 220 and the atmospheric pressure acting on the underside of the diaphragm 220 will force it upwardly against the bias of its spring. This action will have caused the actuator 218 to pull its rod 222 upward and close the auxiliary throttle 206. The principal throttle valve 234 will still be closed and it will have had no effect on the position of the auxiliary throttle 206.

As the load on the engine increases, the pressure in the manifold passage 208 will also increase and a lesser vacuum will be exerted on the upper side of the diaphragm 220 of the actuator 218. Thus, atmospheric pressure acting on the underside of the diaphragm 220 will force it upwardly in opposition to the spring and effect initial opening of the auxiliary throttle valve 206. A portion of the charge will then flow through the main induction passage 208 and port 214 into the engine combustion chamber.

As the primary throttle valve 202 is continued to be opened, it will eventually pass the port that serves in passage 200 and a sudden increase in pressure above the diaphragm 220 will be experienced. At this point in time, the auxiliary throttle valve 206 will be fully opened by the actuator 218.

In FIG. 15, where high speed operation occurs, the actuator will have returned to the position as shown in FIG. 11, due to the reduction in intake manifold vacuum and the principal throttle 234 having been opened, the idler lever 244 will have been drawn upwardly. Either of these conditions will guarantee that the auxiliary throttle valve 206 will be open. However, there may be some circumstances under which the reaction of the actuator 218 will be slower than that called for by the opening of the principal throttle valve 234. Under these circumstances, the mechanical force exerted by the idler lever 244 bearing against the abutment flange 246 can overpower the effect of the actuator 218 and open the auxiliary throttle valve 206 as a function of accelerator position independently of the pressure in the induction system.

A delay in this effect is caused by a lost motion slot 248 in pivoted plate 240. The push rod 242 is connected in the slot 288 by pin 250. Accordingly, the first earlier opening of the principal throttle valve 202 will not open the auxiliary valve 206 but only the later more complete opening. Thus in the initial opening of the principal throttle valve 202, the setting of the auxiliary valve is under control of the actuator 218 which can then be over-ridden as the throttle 202 is opened. Accordingly this constitutes something of a "running" adjustment of the position of the auxiliary valve 206.

It will be observed on all of the embodiments, that the change in position of the auxiliary throttle valve is or may be progressive. However, the design of the bias springs and will be such that the auxiliary throttle valve will be substantially open above light load operation and be substantially closed during such operations.

The term "light load operation" is defined to include idling, coasting, low speed steady running, and starting with the throttle closed.

This invention thereby provides a control for an induction system wherein turbulence in the combustion chamber is caused by injecting the fuel/air mixture into the cylinder at an increased velocity, even though the total amount of the air/fuel mixture is reduced because of the load demand. This is accomplished by conducting the air/fuel mixture under these circumstances through the auxiliary induction passage where it can discharge at the greater velocity through a suitable discharge opening.

It is evident that the division of flow need not be exclusively through one or the other of the induction passages, and in fact when the principal induction passage is open some flow will occur through the auxiliary induction passage. However, this is immaterial, the desired effect being that when the engine operates under light load conditions a sufficient portion of the flow be through the auxiliary induction passage that turbulence will be created in the cylinders.

This invention is not to be limited by the embodiments shown in the drawings and described in the description which are given by way of example and not of limitation, but only in accordance with the scope of the appended claims.

I claim:

1. In combination with an internal combustion engine of the type which includes a variable volume chamber in which combustion occurs, a charge forming device adapted to issue an air/fuel mixture to said chamber, a principal induction passage for delivering a charge to said chamber, a principal throttle valve in said principal induction passage for controlling the flow therethrough, an auxiliary throttle valve in said principal induction passage between said principal throttle valve and said chamber, an auxiliary induction passage extending from a point in said principal induction passage between the said throttle valves and discharging a charge into said chamber to cause the said charge from said auxiliary induction passage to be turbulent in said chamber; the improvement comprising actuator means to control the position of said auxiliary throttle valve, closure of said auxiliary throttle valve means being effective to divert at least a portion of the charge to said chamber through said auxiliary induction passage, said actuator means being responsive to the pressure in said principal induction passage between said throttle valves, said closure occurring at low-load conditions whereby the substantial portion of air/fuel mixture for the chamber flows through said auxiliary induction passage at low load conditions, the effective cross-section of the auxiliary induction passage being smaller than the effective cross-section area of the principal induction passage.

2. Apparatus according to claim 1 in which the actuator means includes a suction chamber bounded in part by a movable diaphragm.

3. Apparatus according to claim 1 in which the auxiliary throttle valve is spring-biased towards its open position.

4. Apparatus according to claim 1 in which said actuator means further comprises linkage means connected to said principal throttle valve.

5. Apparatus according to claim 4 in which said linkage means includes a lost-motion element for effecting at least partial oepning of the principal throttle valve before the auxiliary throttle valve opens, the two throttle valves thereafter opening in unison.

6. Apparatus according to claim 5 in which said linkage means comprises a lever freely rotatable relative to a lever fixed to the auxiliary throttle valve, and in which abutment means on one of said levers is abuttable against the other of said levers whereby the said linkage can overpower the pressure-operated actuator and open the auxiliary throttle valve.

7. Apparatus according to claim 6 in which the actuator includes a suction chamber bounded in part by a movable diaphragm.

8. Apparatus according to claim 1 in which the charge forming device is a carburetor discharging into said principal induction passage and having a plurality of barrels, the said principal throttle valve being the throttle valve in the primary barrel which controls low load operation.

9. Apparatus according to claim 8 in which said auxiliary throttle valve is downstream from the primary barrel and is not in the path of flow from any other barrel.

10. Apparatus according to claim 1 in which the principal induction passage has at least a portion thereof and which extends generally horizontally, the point from which the auxiliary induction passage departs the principal induction passage lying in said horizontal portion and being other than on the bottom of said principal induction passage horizontal portion.

11. Apparatus according to claim 10 in which the said point is in the top of said principal induction passage horizontal portion.

12. Apparatus according to claim 10 in which the said point is in the side of said principal induction passage horizontal portion.

13. Apparatus according to claim 1 in which the auxiliary induction passage includes a tube projecting into said principal induction passage and opening upstream for receiving ram air therefrom.

14. Apparatus according to claim 1 wherein there are a plurality of variable volume chambers in which combustion occurs and in which said auxiliary induction passage comprises a single pipe from the principal induction passage, and a plurality of branch pipes from the single pipe, one to each of the chambers.

15. An internal combustion engine comprising a plurality of variable volume chambers in which combustion occurs carburetor means comprising a plurality of carburetor barrels equal in number to the number of said chambers, a plurality of principal induction passages equal in number to the number of said chambers, each of said principal induction passages terminating in communication with a respective one of said chambers, each individual carburetor barrel communicating with a respective individual principal induction passage for each chamber, an individual principal throttle valve for each carburetor barrel, one auxiliary throttle valve and an auxiliary induction passage communicating at its inlet end with only a selected one of said principal induction passages downstream of its principal throttle valve, said one auxiliary throttle valve being in said selected one principal induction passage downstream of said inlet end of said auxiliary induction passage, said auxiliary induction passage communicates at its outlet end with each of said chambers for delivering a charge from said one selected principal induction passage to each of said chambers, the non-selected principal throttle valves and the said auxiliary throttle valve being interconnected for simultaneous movement, and actuator means comprising linkage interconnecting said selected principal throttle valve and said other valves whereby said selected throttle valve first opens, and after it reaches a predetermined opening, the said other valves open, and in which said auxiliary induction passage departs from said selected principal induction passage and branches to discharge to all of said combustion chambers.

16. Apparatus according to claim 15 in which the carburetor barrel for said selected principal throttle valve is provided with an idle port opening into the respective auxiliary induction passage on the upstream side of the auxiliary throttle valve, whereby to provide for idling operation for all of the combustion chambers.

17. Apparatus according to claim 15 in which the carburetor barrel for said selected principal throttle valve is provided with an air compensatory passage which by-passes the respective principal throttle valve.

18. Apparatus according to claim 15 in which the carburetor barrel for said selected principal throttle valve is provided with engine starting fuel enrichment means.

19. Apparatus according to claim 18 in which the engine starting fuel enrichment means comprises a choke valve.

20. Apparatus according to claim 16 in which the carburetor barrel for said selected principal throttle valve is provided with a choke valve.

21. Apparatus according to claim 17 in which the carburetor barrel for said selected principal throttle valve is provided with a choke valve.

22. Apparatus according to claim 19 in which means is provided to open said choke valve before the auxiliary throttle valve and the non-selected throttle valves start to open.

23. Apparatus according to claim 15 in which an air amount adjusting passage is provided in the selected induction passage having its inlet between the venturi of the respective carburetor barrel and its throttle valve, and its outlet downstream of the auxiliary throttle valve.

24. Apparatus according to claim 23 in which the carburetor barrel for said selected principal throttle valve is provided with an idle port opening into the respective auxiliary induction passage on the upstream side of the auxiliary throttle valve, whereby to provide for idling operation of all of the combustion chambers.

25. Apparatus according to claim 23 in which the carburetor barrel for said selected principal throttle valve is provided with an air compensatory passage which by-passes the respective principal throttle valve.

26. Apparatus according to claim 23 in which the carburetor barrel for said selected principal throttle valve is provided with engine starting fuel enrichment means.

27. Apparatus according to claim 26 in which the carburetor barrel fuel enrichment means comprises a choke valve.

28. Apparatus according to claim 23 in which the outlet of the air amount adjusting passage is formed near the auxiliary throttle valve at the downstream side thereof to supplement air into the selected chamber when the extent of opening of the auxiliary throttle valve is less than a predetermined amount and to balance the air amount in the chambers through the auxiliary induction passage when the extent of opening is greater than said predetermined amount.

29. Apparatus according to claim 28 in which excessive fuel supply ports are provided in the respective carburetor barrels for the other chambers near the respective throttle valves to supply fuel at the same time when air starts to flow through the throttle valves, whereby to compensate for delayed fuel ejection in the main fuel supply system.

30. Apparatus according to claim 15 in which excessive fuel supply ports are provided in the respective carburetor barrels for the other chambers near the respective throttle valves to supply fuel at the same time when air starts to flow through the throttle valves, whereby to compensate for delayed fuel ejection in the main fuel supply system.

31. Apparatus according to claim 17 in which excessive fuel supply ports are provided in the respective carburetor barrels for the other chambers near the respective throttle valves to supply fuel at the same time when air starts to flow through the throttle valves, whereby to compensate for delayed fuel ejection in the main fuel supply system.

32. Apparatus according to claim 18 in which excessive fuel supply ports are provided in the respective carburetor barrels for the other chambers near the respective throttle valves to supply fuel at the same time when air starts to flow through the throttle valves, whereby to compensate for delayed fuel ejection in the main fuel supply system.

33. Apparatus according to claim 19 in which excessive fuel supply ports are provided in the respective carburetor barrels for the other chambers near the respective throttle valves to supply fuel at the same time when air starts to flow through the throttle valves, whereby to compensate for delayed fuel ejection in the main fuel supply system.

34. Apparatus according to claim 23 in which excessive fuel supply ports are provided in the respective carburetor barrels for the other chambers near the respective throttle valves to supply fuel at the same time when air starts to flow through the throttle valves, whereby to compensate for delayed fuel ejection in the main fuel supply system.

35. In an internal combustion engine having a variable volume chamber in which combustion occurs and a main intake passage communicating with said chamber through a main intake port for delivering a charge thereto, the improvement comprising an auxiliary intake passage communicating with said chamber through auxiliary intake port means, said auxiliary intake passage having an effective cross-sectional area substantially less than the effective cross-sectional area of said main intake passage for causing a given mass flow of charge through said auxiliary intake port means to enter said chamber at a significantly greater velocity, said auxiliary intake port means being juxtaposed to said main chamber so that the charge from said auxiliary intake port means enters the open main portion of said chamber at significantly undiminished velocity, valve means for controlling the ratio of communication of said port means with said chamber during a given cycle of operation of said engine, and positioning means for positioning said valve means in response to the load on the engine for causing substantially all of the idle and partial load charge requirements of the engine to be supplied by said auxiliary intake passage and substantially all of the high load charge requirements by said main intake passage.

36. An internal combustion engine having a variable volume chamber in which combustion occurs and a main intake passage communicating with said chamber through main intake port means for delivering a charge thereto, the improvement comprising an auxiliary intake passage communicating with said chamber through auxiliary intake port means, said auxiliary intake passage having an effective cross-sectional area substantially less than the effective cross-sectional area of said main intake passage for causing a given mass flow of charge through said auxiliary intake port means to enter said chamber at significantly greater velocity, valve means for controlling the ratio of the communication of said port means with said chamber during a given cycle of operation of said engine, said valve means comprising a manually operated valve and an automatically operated valve, and positioning means for positioning said automatically operated valve means in response to the load on the engine for causing substantially all of the idle and partial load charge requirements of the engine to be supplied by said auxiliary intake passage and substantially all of the high load charge requirements by said main intake passage, said positioning means being responsive to the pressure in the main induction passage between said valves.

37. An internal combustion engine as set forth in claim 36 wherein the valve means includes a manually operated valve and an automatically operated valve, the positioning means being responsive to the pressure in the main intake passage between the manually positioned valve and the main intake port means.

38. An internal combustion engine as set forth in claim 35 wherein the valve means comprises a manually positioned throttle valve positioned in the main intake passage and an automatically positioned throttle valve for controlling the flow through the auxiliary induction passage.

39. An internal combustion engine having a variable volume chamber in which combustion occurs and a main intake passage communicating with said chamber through main intake port means for delivering a charge thereto, the improvement comprising an auxiliary intake passage communicating with said chamber through auxiliary intake port means, said auxiliary intake passage having an effective cross-sectional area substantially less than the effective cross-sectional area of said main intake passage for causing a given mass flow of charge through said auxiliary intake port means to enter said chamber at a significantly greater velocity, valve means for controlling the ratio of the communication with said port means with said chamber during a given cycle of operation of said engine, and positioning means for positioning said valve means in response to the load on the engine for causing substantially all of the idle and partial load charge requirements of the engine to be supplied by said auxiliary intake passage and substantially all of the high load charge requirements by said main intake passage, said valve means comprising a manually positioned throttle valve in said main induction passage and an automatically positioned throttle valve for controlling the flow through said auxiliary induction passage, the intake to the auxiliary induction passage being derived from the main induction passage downstream of the manually positioned throttle valve, said automatically positioned throttle valve being positioned in said main intake passage downstream of said manually positioned throttle valve and downstream of the point of introduction of charge to the auxiliary intake passage from said main intake passage, said positioning means being responsive to the pressure at a point between said throttle valves.

40. An internal combustion engine as set forth in claim 36 further including a charge forming device for delivering fuel to at least one of the intake passages.

41. An internal combustion engine as set forth in claim 40 wherein the intake passages have a common intake and the charge forming device charges both of the intake passages.

42. An internal combustion engine as set forth in claim 35 wherein the intake to the auxiliary induction passage is derived from the main induction passage downstream of the manually positioned throttle valve, the automatically positioned throttle valve being positioned in said main intake passage downstream of said manually positioned throttle valve and downstream of the point of introduction of charge to the auxiliary intake passage from said main intake passage, said positioning means being responsive to the pressure at a point between said throttle valves.

43. An internal combustion engine as set forth in claims 35, 36 or 39 wherein an intake valve cooperates with the main intake port means for controlling the flow therethrough, the auxiliary intake port being in communication with the main intake passage contiguous to the main intake port means.

44. An internal combustion engine as set forth in claims 37, 39 or 42 wherein an intake valve cooperates with the main intake port means for controlling the flow therethrough, the auxiliary intake port being in communication with the main intake passage contiguous to the main intake port means, and wherein the auxuliary intake port discharges into the main intake passage at a substantially different angle than the direction of flow through the main intake passage at the point of discharge of said auxiliary intake port means.

45. In an internal combustion engine having a substantially open, main variable volume chamber in which combustion occurs and a main intake passage communicating with said chamber through main intake port means for delivering a charge therethrough, the improvement comprising an auxiliary intake passage communicating with said chamber through auxiliary intake port means, said auxiliary passage having an effective cross-sectional area substantially different than the effective cross-sectional area of said main intake passage for causing a given mass flow of charge through said auxiliary intake port means to enter said chamber at a significantly greater velocity, said auxiliary intake means being related to said open main chamber so that the charge from said auxiliary intake means enters the open main portion of said chamber at substantially undiminished velocity, and an inlet for said auxiliary intake passage extending into said main intake passage and having its opening disposed in the direction of flow through said main intake passage for generating a ram effect on the flow through said auxiliary intake passage.

46. In an internal combustion engine having a variable volume chamber in which combustion occurs, a two-stage carburetor for delivering a charge of fuel/air mixture through at least a primary barrel and a secondary barrel, and a main intake passage communicating with said barrels at its inlet end and with said chamber through a main intake port at its outlet end for delivering a fuel/air charge to said chamber, the improvement comprising an auxiliary intake passage communicating only at its inlet end with the primary barrel of said carburetor and at its outlet end with said chamber for delivering a fuel/air charge from said primary barrel to said chamber, said auxiliary intake passage having an effective cross-sectional area substantially less than the effective cross-sectional area of said main intake passage for causing a given mass of charge through said auxiliary intake passage to enter said chamber at a significantly greater velocity, and valve means for controlling the ratio of communication of said passages with said chamber during a given cycle of operation.

47. In an internal combustion engine having a plurality of variable volume chambers in which combustion occurs, a plurality of main intake passages each communicating with a respective chamber through a respective main intake port for delivering a charge thereto, a plurality of carburetors barrels each serving at least one respective chamber through its respective main intake passage, certain of said carburetor barrels being out of communication with the respective main intake passages of said chambers, the improvement comprising a plurality of auxiliary intake passages each communicating with a respective chamber, said auxiliary intake passages having an effective cross-sectional area substantially less than the effective cross-sectional area of the main intake passages for causing a given mass flow of charge through said auxiliary intake passage to enter the respective chamber at a substantially greater velocity than the charge entering from the respective main intake passage, at least one of said carburetor barrels being provided with cold starting enrichment means for discharging from said one carburetor barrel a richer than normal mixture for cold starting and cold running, at least one of the other of said carburetor barrels being devoid of a cold starting enrichment means, and means for communicating the auxiliary intake passage of the chamber served by said one carburetor barrel and the auxiliary intake passage of a chamber served by said other carburetor barrel with the discharge of said one carburetor barrel for delivering a cold starting enriched mixture to said one chamber and said other chamber from said carburetor barrel having said cold starting enrichment means and valve means for controlling the ratio of communication of said passages with said chambers during a given cycle of operation of said engine.

48. An internal combustion engine as set forth in claim 47 wherein the cold starting enrichment means comprises a choke valve.

49. In an internal combustion engine having a plurality of variable volume chambers in which combustion occurs, a plurality of main intake passages each communicating with a respective chamber for delivering a charge thereto, a plurality of carburetor barrels each serving at least one respective chamber through its respective main intake passage, certain of said carburetor barrels being out of communication with the respective main intake passages of certain of said chambers, the improvement comprising a plurality of auxiliary intake passages each communicating with a respective chamber substantially less than the effective cross-sectional area of said main intake passages for causing a given mass flow of charge through said auxiliary intake passage to enter the respect chamber at a substantially greater velocity than the charge entering from the respective main intake passage, at least one of said carburetor barrels being provided with a specific fuel discharge system for discharging from said one carburetor barrel mixture particularly adapted for a particular range of engine operation, at least one of the other of said carburetor barrels being devoid of such a specific fuel discharge system, and means for communicating the auxiliary intake passage of the chamber served by said one carburetor barrel and the auxiliary intake passage of a chamber served by said other carburetor barrel with the discharge of said one carburetor barrel for delivering the specific mixture of said one specific fuel discharge system to said one chamber and said other chamber from said carburetor barrel having said specific fuel discharge system, and valve means for controlling the ratio of communication of said passages with said chambers during a given cycle of operation of said engine.

50. An internal combustion engine as set forth in claim 49 wherein the specific fuel discharge system of the one carburetor barrel provides for idle operation of the associated engine.

51. An internal combustion engine as set forth in claim 50 wherein the one carburetor barrel is further provided with a choke valve for providing cold starting enrichment, the other carburetor barrel being devoid of a choke valve.

52. An internal combustion engine as set forth in claim 50 wherein all of the carburetor barrels have high speed fuel discharge means, the other carburetor barrel having transition fuel discharge means for discharging supplemental fuel upon the transition from idle in which fuel is supplied by said one carburetor barrel to high speed operation when fuel is supplied by each of the mentioned carburetor barrels.

53. An internal combustion engine having a plurality of variable volume chambers in which combustion occurs, a main induction system comprising a plurality of main intake passages each communicating with a respective chamber for delivering a charge thereto, an auxiliary induction system comprising a plurality of auxiliary intake passages each communicating with a respective chamber, said auxiliary intake passages having an effective cross-sectional area substantially less than that of said main intake passage for causing a given mass flow of charge through said auxiliary intake passage to enter the respective chamber at a substantially greater velocity than the charge entering from a respective main intake passage, said auxiliary induction system having an inlet means in communication with said main induction system and valve means for controlling the ratio of communication of said passages with said chambers during a given cycle of operation of said engine, said valve means comprising a throttle valve positioned in said main induction system upstream of said auxiliary induction system inlet and a plurality of control valve each positioned in a respective one of said main intake passages, at least two of said control valves being disposed coaxially with each other and with said throttle valve.

54. An internal combustion engine as set forth in claim 53 wherein the control valves are all affixed to a common shaft for simultaneous rotation.

55. An internal combustion engine comprising a substantially open, main chamber of variable volume in which combustion occurs, a main induction passage for supplying a charge to said chamber, an auxiliary induction passage for supplying a charge to said open main chamber, said auxiliary induction passage having a substantially lesser effective area than said main induction passage whereby a given mass volume of flow will enter said chamber at a greater velocity from said auxiliary induction passage than through said main induction passage, said auxiliary induction passage communicating with said open main chamber so that the charge therefrom enters said open main chamber at substantially undiminished velocity, said auxiliary induction passage having its inlet in communication with said main induction passage downstream of its inlet, a first throttle valve in said main induction passage between its inlet and said auxiliary intake passage inlet, a second throttle valve in said main induction passage between said auxiliary induction passage inlet and said chamber, closure of said second throttle valve being effective to direct the flow to said chamber through said auxiliary induction passage, means for manually operating said first throttle valve, and load responsive means responsive to the pressure in said main induction passage between said throttle valves for operating said second throttle valve so that substantially the full chamber charge requirements at low and partial load are supplied through said auxiliary induction passage and a large proportion of the chamber charge requirements at full load are supplied through said main induction passage.

56. An internal combustion engine as set forth in claim 55 further including a charge forming device for discharging fuel into the main induction passage upstream of the auxiliary induction passage inlet.

57. An internal combustion engine as set forth in claim 56 wherein the charge forming device serves both main and auxiliary intake passages.

58. An internal combustion engine as set forth in claim 55 further including linkage means for overriding said load responsive means when the first throttle valve is opened more than a pre-determined degree.

59. A multi-cylinder internal combustion engine having a plurality of cylinders each having a combustion chamber, an intake port, an intake valve, and an exhaust port, said engine comprising an intake manifold comprising a collecting portion having an inlet, and a plurality of manifold branches branched off from said collecting portion, each of said manifold branches being connected to the intake port of a corresponding one of the cylinders; a carburetor having a throttle valve and arranged in the inlet of said collecting portion; at least one auxiliary intake passage, common to at least two cylinders and having an inlet which opens into said collecting portion and an outlet; at least two auxiliary branch intake passages branched off from the outlet of said auxiliary intake passage, each of said auxiliary branch intake passages having an outlet which open into the intake port of a respective one of said at least two cylinders; and secondary valve means arranged in each of said manifold branches and opened in accordance with a reduction in the level of vacuum in said intake manifold.

60. A multi-cylinder internal combustion engine as claimed in claim 59 wherein each of said auxiliary branch intake passages has a cross-section which is smaller than that of the corresponding manifold branch.

61. A multi-cylinder internal combustion engine as claimed in claim 59 wherein each auxiliary intake passage has a cross-section which is smaller than that of the corresponding manifold branch.

62. A multi-cylinder internal combustion engine as claimed in claim 59 wherein the outlet of each of said auxiliary branch intake passages is in the vicinity of the corresponding intake valve.

63. A multi-cylinder internal combustion engine as claimed in claim 62 wherein the outlet of each of said auxiliary branch intake passages is directed to a gap formed between the corresponding intake valve and a valve seat thereof when the intake valve is opened.

64. A multi-cylinder internal combustion engine as claimed in claim 59 wherein said secondary valve means comprises a plurality of secondary throttle valves, each being positioned in the manifold branch of a respective cylinder.

65. A multi-cylinder internal combustion engine as claimd in claim 64 wherein each of said secondary throttle valves is located near the intake port of the respective manifold branch.

66. A multi-cylinder internal combustion engine as claimed in claim 64 wherein said secondary throttle valves are fixed onto a common throttle shaft.

67. A multi-cylinder internal combustion engine as claimed in claim 66 wherein said engine further comprises a vacuum operated diaphragm apparatus connected to said common throttle shaft for opening said secondary throttle valves in accordance with a reduction in the level of vacuum produced in said intake manifold.

68. A multi-cylinder internal combustion engine as claimed in claim 67 wherein said diaphragm apparatus comprises a diaphragm connected to said common throttle shaft and a vacuum chamber connected to said intake manifold.

* * * * *

UNITED STATES PATENT AND TRADEMARK OFFICE
CERTIFICATE OF CORRECTION

PATENT NO. : 4,445,473
DATED : May 1, 1984
INVENTOR(S) : Hiromitsu Matsumoto

It is certified that error appears in the above-identified patent and that said Letters Patent is hereby corrected as shown below:

Column 12, line 68, delete "and".

Column 14, line 3, claim 5, delete "oepning" and substitute --opening--.

Column 15, line 18, claim 16, delete "for" and substitute --of-- (second occurrence).

Column 18, line 35, claim 44, delete "auxuliary" and substitute --auxiliary--.

Column 16, line 46, claim 35, after "a" insert --substantially open main--

Column 16, line 49, claim 35, delete "a".

Column 16, line 49, claim 35, after "port" insert --means--.

Column 19, line 64, claim 49, delete "respect" and substitute --respective--.

Column 20, line 53, claim 53, delete "valve and substitute --valves--.

Column 22, line 31, claim 65, delete "claimd" and substitute --claimed--.

Signed and Sealed this

Nineteenth Day of March 1985

[SEAL]

Attest:

DONALD J. QUIGG

Attesting Officer

Acting Commissioner of Patents and Trademarks